(12) United States Patent
Cheng et al.

(10) Patent No.: US 8,935,529 B2
(45) Date of Patent: Jan. 13, 2015

(54) METHODS AND SYSTEMS FOR END-TO-END SECURE SIP PAYLOADS

(75) Inventors: Yi Cheng, Sundbyberg (SE); Åke Busin, Sollentuna (SE); Luis Barriga, Johanneshov (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1162 days.

(21) Appl. No.: 12/627,984

(22) Filed: Nov. 30, 2009

(65) Prior Publication Data

US 2011/0131414 A1    Jun. 2, 2011

(51) Int. Cl.
*G06F 21/00* (2013.01)
*H04L 29/06* (2006.01)

(52) U.S. Cl.
CPC ............ *H04L 63/06* (2013.01); *H04L 63/0823* (2013.01); *H04L 63/168* (2013.01)
USPC ........... 713/168; 713/150; 713/170; 713/171; 380/255

(58) Field of Classification Search
CPC .... H04L 63/06; H04L 63/0823; H04L 63/168
See application file for complete search history.

(56) References Cited

U.S. PATENT DOCUMENTS

| 2005/0287990 | A1* | 12/2005 | Mononen et al. | 455/411 |
| 2006/0218396 | A1* | 9/2006 | Laitinen et al. | 713/167 |
| 2007/0162744 | A1* | 7/2007 | Hoshino et al. | 713/156 |
| 2008/0016230 | A1* | 1/2008 | Holtmanns et al. | 709/229 |
| 2008/0162935 | A1* | 7/2008 | Ginzboorg et al. | 713/170 |
| 2009/0209232 | A1* | 8/2009 | Cha et al. | 455/411 |

FOREIGN PATENT DOCUMENTS

| WO | WO 2009070075 A1 * | 6/2009 |
| WO | WO 2009078775 A1 * | 6/2009 |

OTHER PUBLICATIONS

W. Jiang, A Lightweight Secure SIP Model for End-to-End Communication, in Proc. the 10th Intl. Symp. on Broadcasting Technology (ISBT '05): 413-419, Beijing, Aug. 2005.*
ETSI TS 133220 (V7.11.0). Apr. 2008. pp. 1-75.*
"Processor." The American Heritage® Science Dictionary Copyright © 2005 by Houghton Mifflin Company. Published by Houghton Mifflin Company.*

* cited by examiner

*Primary Examiner* — Lisa Lewis
*Assistant Examiner* — Kendall Dolly

(57) ABSTRACT

Methods, systems and communication nodes for protecting Session Initiation Protocol (SIP) message payloads are described. Different protection techniques can be used to protect SIP payloads depending upon, for example, whether a recipient client application resides in a user equipment or an application server and/or whether a recipient client application resides in a same SIP/IP domain as the target SIP application server which is sending the SIP payloads.

13 Claims, 6 Drawing Sheets

METHODS AND SYSTEMS FOR END-TO-END SECURE SIP PAYLOADS

TECHNICAL FIELD

The present invention relates generally to telecommunications systems and improving service therein and, more particularly, to providing secure communications in systems employing Session Initiation Protocol (SIP) for transporting sensitive user data payloads or, in general, sensitive application payloads.

BACKGROUND

As the sophistication level of communications technology increases, the options for communications service have become more varied. For example, in the last 30 years in the telecommunications industry, personal communications have evolved from a home having a single rotary dial telephone, to a home having multiple telephone, cable and/or fiber optic lines that accommodate both voice and data. Additionally, cellular phones and Wi-Fi have added a mobile element to communications. Similarly, in the entertainment industry, 30 years ago there was only one format for television and this format was transmitted over the air and received via antennas located at homes. This has evolved into both different standards of picture quality such as, standard definition TV (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available throughout the network including the "last mile" to the end user.

Another related technology that impacts both the communications and entertainment industries is the Internet. The physical structures of the Internet and associated communication streams have also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other Internet Protocol (IP) networks) as a mechanism for providing traditional services. These multimedia services include IP television (IPTV, referring to systems or services that deliver television programs over a network using IP data packets), video on demand (VOD), voice over IP (VoIP), and other web related services received singly or bundled together.

To accommodate the new and different ways in which IP networks are being used to provide various services, new network architectures are being developed and standardized. Internet Multimedia Subsystem (IMS) is an architectural framework utilized for delivering IP multimedia services to an end user. The IMS architecture has evolved into a service-independent topology which uses IP protocols, e.g., Session Initiation Protocol (SIP) signaling, to provide a convergence mechanism for disparate systems. More specifically, the SIP protocol was designed as a signaling protocol for establishing application sessions and the IMS architecture relies on the SIP protocol and defines security mechanisms and protocols that protect the signaling.

In the Open Mobile Alliance (OMA) forum, the generic term "SIP/IP core" is often used to refer to a SIP-based architecture that can be also based on IMS or any other architecture with similar properties. In a system employing a SIP/IP core, SIP messages are usually routed through a series of proxies before reaching their destinations. SIP signaling in general crosses operator boundary domains, e.g. when a user is roaming or when the sender and the receiver belong to different security domains. Signaling protection in such situations is achieved hop-by-hop using security measures varying from cryptography, VPN to physical isolation and dedicated lines. For example, RFC 3261 specifies several security mechanisms for protecting SIP signaling. These mechanisms include digest authentication, which allows SIP entities to authenticate each other and prevents replay attacks, but does not deal with confidentiality. Another mechanism referred to in RFC 3262 called TLS provides only hop-by-hop security for signaling.

Traditionally, the media path associated with a connection handled by a SIP/IP core based system (which is sometimes also called the "application path" or "user data path") is separated from the signaling path (which is sometimes also called the "control path") associated with that same connection. Whereas SIP is used for the signaling path, other protocols are typically used for the media path such as RTP, HTTP or MSRP. The security mechanisms for protecting the media path can vary based on the sensitivity of the data, business models, operator policies and regulation. In general, the protection requirements for SIP signaling will differ from the ones for media/data path protection due to different type of information carried in each case.

Some application servers and enablers have started to use SIP for transporting application/user data as additional payloads. For example, short messaging, location, presence, personal data and device management services have begun to use SIP to carry payloads. Some of these applications may carry data that is not sensitive and thus the underlying SIP/IP core security is sufficient for them. More specifically, in IMS networks, SIP messages are protected by IPSec along the communication path from terminal to P-CSCF and vice versa and the IMS core (i.e., the portion of the network where the P/I/S-CSCF, the HSS, and various IMS application servers are located) is assumed to be secure, by IP Domain Security or physical means. In typical SIP networks, hop-by-hop message authentication or TLS is often used, however, S/MIME is also being considered for protecting separate elements of SIP messages.

There are, however, applications that use SIP payloads to transport end-to-end sensitive data for which the underlying SIP/IP core security described above is not sufficient. User data that is carried in SIP payloads will be visible to SIP proxies if no end-to-end encryption is applied. This is likely to be unacceptable for applications where user privacy is a big concern. For example, information about a user's current location should not be disclosed to parties other than those authorized by the user. Similarly, presence information, address book information, and the like could be sensitive from user's privacy perspective.

Accordingly, it would be desirable to provide systems and methods which address security issues in such architectures and, more specifically, which protect application data SIP payloads with additional security mechanisms that meet the end-to-end security requirements.

SUMMARY

According to an exemplary embodiment a method for protecting a Session Initiation Protocol (SIP) message payload transmitted between a target SIP application server toward a client application residing in one of a user equipment (UE) or in another SIP application server includes the steps of: determining whether the target SIP application server is associated with the client application's domain or with another domain which is different than the client application's domain, if the target SIP application server is associated with the client application's domain and if the client application resides in then UE, then protecting the SIP message payload using a Generic Bootstrapping Architecture (GBA) key management protocol between the client application residing in the UE and the target SIP application server, and if the target SIP application server is associated with another domain or if the client application resides in another SIP application server, then protecting the SIP message payload using a hop-by-hop key management protocol between the client application and the target SIP application server.

According to another exemplary embodiment, an intermediate SIP server for routing SIP messages from a target SIP application server located in a first SIP/IP domain to a client application located in a second SIP/IP domain includes an interface for receiving a first SIP message directed to the client application, the message including an encrypted SIP payload protection key from the target SIP application server, and a processor for decrypting the encrypted SIP payload protection key with a secret key associated with the intermediate SIP server, re-encrypting the decrypted SIP payload protection key using a public key infrastructure (PKI) technique if the client application resides in an application server or a Generic Bootstrapping Architecture (GBA) technique if the client application resides in a user equipment, and transmitting the re-encrypted SIP payload protection key toward the application client.

According to another exemplary embodiment, a target SIP application server which transmits SIP payloads toward application clients includes an interface for receiving SIP messages requesting updates from the target SIP application server, and a processor for generating and transmitting protected SIP payloads for transmission to client applications in response to the SIP messages, wherein the processor protects the SIP payloads using one of: a public key infrastructure (PKI) technique for SIP payloads to be transmitted toward client applications which reside in an application server, and a Generic Bootstrapping Architecture (GBA) technique for SIP payloads to be transmitted toward client applications which reside in a user equipment.

BRIEF DESCRIPTION OF THE DRAWINGS

The accompanying drawings illustrate exemplary embodiments, wherein.

LIST OF ABBREVIATIONS

Figure 1:
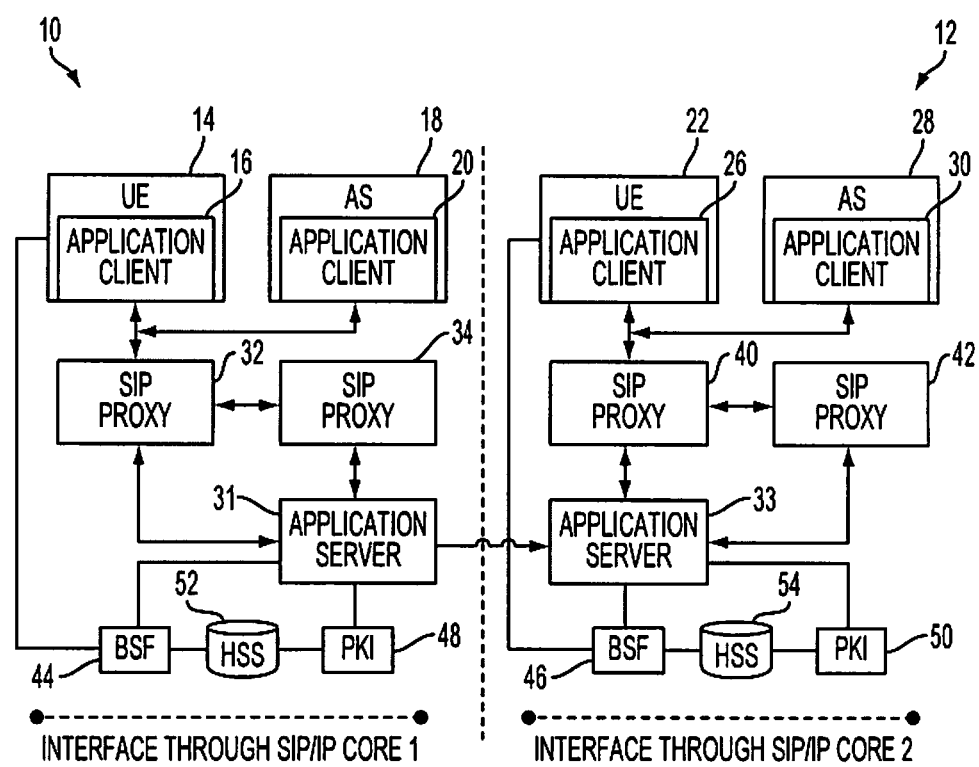
FIG. 1 illustrates two SIP/IP domains in which SIP payloads may be communicated and protected according to exemplary embodiments.

AS Application Server
BSF Bootstrapping Server Function
B-TID Bootstrapping Transaction Identifier
CMS Cryptographic Message Syntax
GBA Generic Bootstrapping Architecture
HSS Home Subscriber Server
NAF Network Application Function
PKI Public Key Infrastructure
UE User Equipment (consists of ME and UICC)
ME Mobile equipment (the terminal)
UICC Universal Integrated Circuit Card (smartcard)
SIM Subscriber Identification Module (application running on a UICC)
USIM Universal SIM
ISIM IP Multimedia Services Identity Module
R-SIM Removable SIM
R-UIM Removable User Identity Module
SIP Session Initiation Protocol

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Systems, methods, devices and software according to exemplary embodiments address, for example, payload protection in SIP-based systems such as IMS. In order to provide some context for this discussion, a high level, exemplary groupings of devices, systems and communication links in which such payload protection techniques can be implemented will now be described with respect to FIG. 1.

Therein, a first SIP/IP domain 10 is shown on the lefthand side of the figure, and a second SIP/IP domain 12 is shown on the righthand side. Both domains can have a number of different application clients operating on different devices. More specifically, each domain may contain a number of user equipments (UEs) or application servers (AS), each of which are running one or more application clients (software). To exemplify these different types of mechanisms, SIP/IP domain 10 is shown as including a UE 14 including its own application client 16, and an AS 18 including its own application client 20. Similarly, SIP/IP domain 12 includes a UE 22 running an application client 26, and an AS 28 running an application client 30. Those skilled in the art will appreciate that each domain 10, 12 will typically include multiple UEs and ASs, however only one of each is shown to simplify the figure. Moreover, those skilled in the art will further appreciate that each UE and AS may be executing more than one application client simultaneously.

The application clients 16, 20, 26 and 30 may operate as suppliers and/or consumers of data. For example, any of the application clients 16, 20, 26 and 30 can provide a SIP-based service to which other clients may subscribe. Alternatively, the application clients may solely consume data supplied by application servers within the network. Suppose, as an illustrative example, that application server 31 provides a service associated with the location of a fleet of taxicabs, and further that the application clients 16, 20, 26 and 30 were subscribers of this service (so-called "watchers"). In this case service updates would periodically be transmitted by the application server 31 ("the target SIP application server") to the application clients 16, 20, 26 and 30. As seen in FIG. 1, this involves the exchange of data (SIP payloads) across two security domains 10 and 12 using SIP as a bearer. Note that, as used herein, a target SIP application server may be any SIP-based equipment, e.g., an IMS server, etc.

More specifically, as seen in the exemplary embodiment of FIG. 1, this means transmitting, by application server 31, the SIP update messages associated with this service through one or more SIP proxies 32, 34 in the same domain 10 toward the application clients 16 and 20 and through an intermediate SIP application server 33 which is disposed in SIP/IP domain 12, but has an interface with SIP/IP domain 10. The intermediate SIP application server 33 can then forward the updates on to application clients 26 and 30 via one or more SIP proxies 40, 42. As will be appreciated by those skilled in the art, various nodes in the SIP path described above can see or change the data in the SIP messages, e.g., the SIP proxies 32, 34, 40 and 42. This raises the potential problem that sensitive application data may be unnecessarily exposed, thereby not meeting e2e security requirements.

One way to address this problem, at least for the case when the application client resides in a UE and the application server resides in the network, is using "Generic Bootstrapping Architecture" (GBA) techniques which are capable of distributing shared secrets to the UEs and a Network Application Function (NAF) using AKA-based mechanisms as described, for example, according to 3GPP GBA TS 33.220 "3rd Generation Partnership Project; Technical Specification Group Services and System Aspects; Generic Authentication Architecture (GAA); Generic Bootstrapping Architecture". Then, within the same operator domain, the application server would need to implement NAF functionality to communicate with a Bootstrapping Server Function (BSF) and to the UE 14. When the application server resides in a different domain than the subscriber(s), the application server would interface with the UE's home BSF via a so-called Zn-proxy.

However, this solution to the problem of security for interdomain transfer of SIP payloads suffers from some potential drawbacks. For example, in SIP-based architectures, the communication often traverses SIP proxies, but GBA assumes a direct connection between communicating parties. Additionally, the required Zn-proxy is an additional extra functionality in the visited network that needs to be placed in the SIP route and, currently, the GBA specifications do not address SIP architectures. Moreover, the Zn-proxy can only be used for GBA purposes between operators and cannot be used for the case when the application client resides in another application server. Lastly, at least for some application clients, when the application client needs to communicate with an application server in another domain, the SIP messages are always routed via a home SIP application server and GBA does not work under such constraints.

Accordingly exemplary embodiments provide a SIP communications protection scheme for inter-operator communications which works both for cases when the application client is a terminal and when the application client is an application server. Such exemplary embodiments employ a composite key management system based on both GBA and Public Key Infrastructure (PKI) protection techniques so that only authorized parties have access to the protected SIP payloads, even if they reside in different domains. More specifically, two key management schemes for arranging symmetric keys for SIP payload encryption and integrity protection are used together according to these exemplary embodiments by leveraging GBA for communications involving UEs that have a SIM/USIM/ISIM/R-SIM and using PKI for communications involving application servers that act as a client and retrieve user data from another application server. Thus, as seen in FIG. 1, the exemplary UEs 14 and 22 each have an interface toward respective BSFs 44 and 46, while (intermediate) application servers 31 and 33 have respective interfaces both toward respective BSFs 44 and 46 and respective PKI functions 48 and 50. Also seen in FIG. 1 are the home subscriber systems (HSS) 50 and 52 which are databases that provide subscriber information to the BSFs 44, 46 and PKIs 48, 50.

Figure 2:
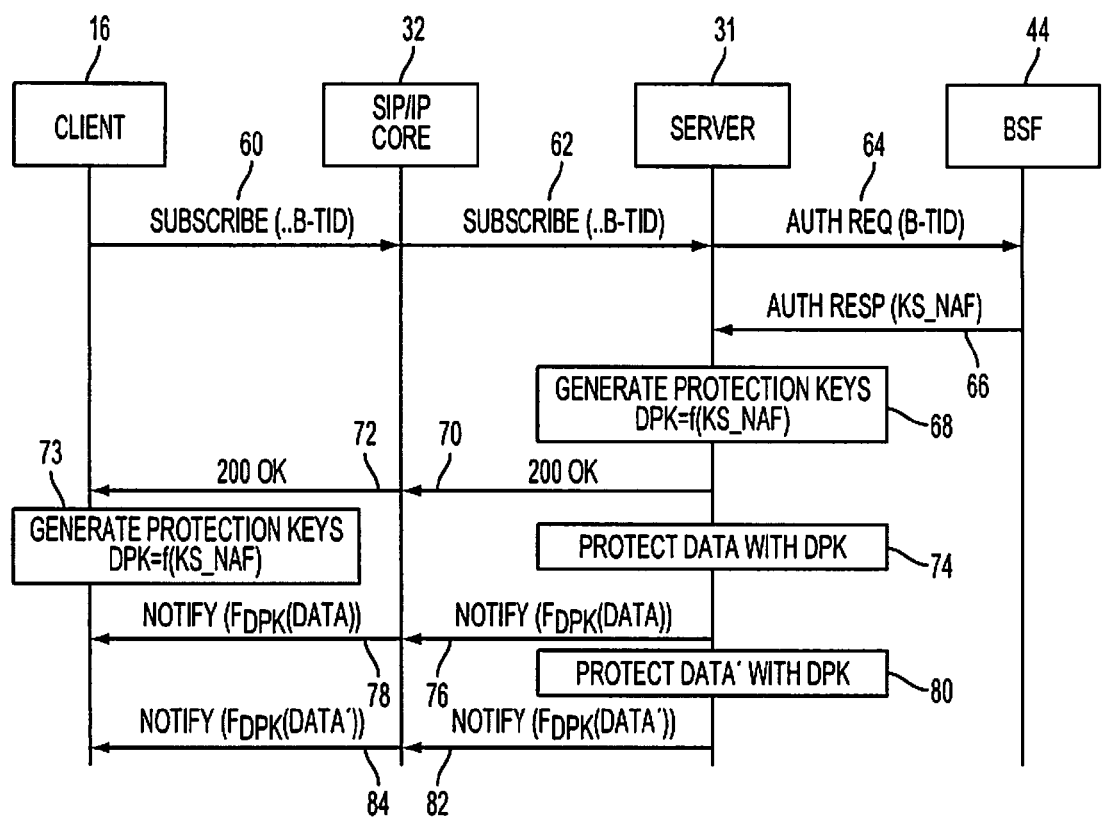
FIG. 2 is a signaling diagram which depicts protection of SIP payloads between a client residing in a user equipment and a target SIP application server according to an exemplary embodiment.

Thus, according to exemplary embodiments, when the application client resides in a UE, e.g., UE 14, and the target SIP application server is located in the same domain as the UE, e.g., SIP application server 31, then a GBA protection scheme is employed for key management between the application client 16 and the application server 31. FIG. 2 is an exemplary signaling diagram which illustrates how protection of SIP payloads can be performed for this usage case according to an exemplary embodiment. Therein, it is initially assumed that the UE 14 and the BSF 44 have previously established a valid protection key Ks and a Bootstrapping Transaction Identifier (B-TID) by having performed a GBA bootstrapping procedure there between. Then, as shown by signal 60, the application client 16 sends a SIP method message, such as SIP SUBSCRIBE, to the target SIP application server via the SIP/IP core, as represented by SIP proxy node 32. However, those skilled in the art will appreciate that there may be many other nodes between the application client 16 and the target SIP application server 31. The SIP method message 60 contains the B-TID that was obtained during the GBA bootstrapping process.

The SIP/IP core 32 sends the SIP message on to the target SIP application server 31 via message 62. The target SIP application server 31 retrieves the KS_NAF key information from the BSF 44 using the B-TID via signals 64 and 66 and then generates one or more Data Protection Keys (DPK) from the KS_NAF key information at block 68. The type of protection provided by the target SIP application server 31 can be integrity and/or confidentiality and, therefore, one or more DPKs can be derived by the target SIP application server 31 to protect SIP payloads associated with this particular subscription. For confidentiality protection, encryption of the SIP payload is needed, alternatively if integrity protection is desired, message authentication mechanisms (e.g., a keyed hash) can be applied. The DPK key(s) are used later by the target SIP application server 31 to protect sensitive data sent to the application client 16 using, for example, a technique described below. The target application SIP application server 31 replies to the application client 16 with SIP 200 OK messages 70 and 72 which are communicated via the SIP/IP core 32. The application client 16 derives the DPKs from the KS_NAF key which the application client calculated from Ks, at step 73, using the same key derivation function as the target SIP application server 31.

When the target SIP application server 31 has sensitive data to send to the application client 16, it protects the data (block 74) with the DPK key(s) and sends the resulting protected data payload using a SIP message, for example a SIP NOTIFY message 76, which is forwarded on to the application client 16 via the SIP/IP core 32 and signal 78. When the target SIP application server 31 has new sensitive data to send to the application client 16, it protects the new data (data' in block 80 of FIG. 2) with the same DPK key(s) and sends the result in another SIP method signal, e.g., signals 82 and 84, to the application client 16.

FIG. 2 illustrates an exemplary embodiment wherein the DPK protection keys are derived from the KS_NAF key information in a manner which results in one key per watcher (i.e., per subscriber). According to another exemplary embodiment, however, these keys can be generated by the target SIP application server using its own procedures such that keys are generated on a one key per target server basis. The server could then encrypt ("wrap") these server-generated keys using the KS_NAF key information (or a key derived from KS_NAF) and send them to the application clients, for example, either in the first SIP 200 OK message or attached to the protected data. By using per-target DPKs instead of per-watcher DPKs, there is no need to re-encrypt the same protected data for different watchers, i.e., the application server can encrypt the sensitive data once and distributes it to several watchers. On the other hand, per-target DPK embodiments do pose the added risk that if one of the watchers becomes unauthorized, there may be the possibility that the watcher continues to receive sensitive data (and is able to decrypt that data) during a period of time until the application server recognizes that particular watcher's change in status and either changes DPK(s) or stops sending updates to that application client.

Figure 3:
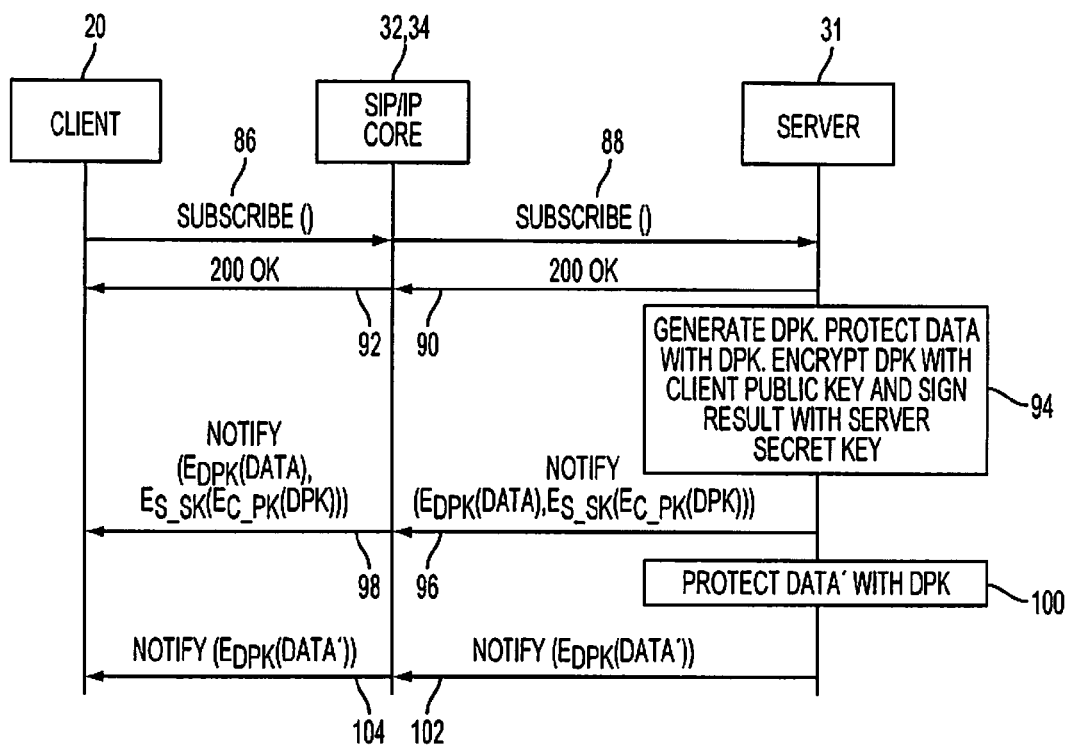
FIG. 3 is a signaling diagram which depicts protection of SIP payloads between a client residing in an application server and a target SIP application server according to an exemplary embodiment.

According to exemplary embodiments, other protection techniques, e.g., public key based key establishment techniques, are used for cases where the application client's logic resides in application servers or enablers as opposed to UEs. For these scenarios, it is initially assumed that the application clients have been provisioned with a public/private key pair or a digital certificate, e.g., using a PKI infrastructure for certificate retrieval or via certificate exchange over SIP. FIG. 3 illustrates exemplary signaling associated with SIP payload protection according to this exemplary embodiment. Therein, the application client 20 uses a SIP method, such as a SIP SUBSCRIBE message 86, to request updates from the target SIP application server 31 via the SIP/IP core 32, 34 and message 88. The SIP SUBSCRIBE message 80 can contain the application client 20's public key or certificate whose public key is denoted here as C_PK. The application server 31 then verifies the received public key C_PK, e.g., by using PKI 48, and replies with a SIP 200 OK message 90. The SIP 200 OK message 90 can contain the application server 31's public key or its certificate, whose public key is denoted here as S_PK, and is forwarded on to the application client 20 via SIP/IP core 32, 34 and message 92.

The application client 20 then verifies S_PK, e.g., using PKI 48. When the target SIP application server 31 has some sensitive data to send to the application client 20, it generates DPK(s) and protects the data with the DPK(s). The target SIP application server 31 also encrypts the DPK(s) with the application client 20's public key C_PK and signs the result with its private key, denoted here as S_SK, as shown in block 94. The target SIP application server 31 sends the encrypted data, together with the protected DPK(s), using an appropriate SIP method, for example the SIP NOTIFY message 96 as shown in FIG. 3. As discussed above with respect to the exemplary embodiment of FIG. 2, the type of protection which is applied to the SIP payload can be integrity protection and/or confidentiality protection. For confidentiality protection, encryption of the SIP payload can be performed using one key. For integrity protection, the target SIP application server 31 should generate another key, and also send a protected copy of that key to the application client 20. Message authentication mechanisms (e.g., keyed hash) can then be applied for integrity protection. This protected SIP payload is forwarded on to the application client 20 from the SIP/IP core 32, 34 via SIP NOTIFY message 98. The application client 20 verifies the target SIP application server 20's signature and recovers the DPK(s) by using its own private key first to decrypt the key portion of the received SIP message. The application client 20 can then use the DPK(s) to retrieve the received SIP payload data.

When the target SIP application server 31 has new sensitive data to send to the application client 20, it protects the new data (denoted data' in block 100) with the same DPK(s) and sends the result with another SIP method, e.g., SIP NOTIFY message 102. This protected SIP payload is forwarded on to the application client 20 from the SIP/IP core 32, 34 via SIP NOTIFY message 104. The application client 20 uses the DPK(s) to retrieve the received SIP payload data.

Various permutations, modifications and additions are also contemplated with respect to these foregoing exemplary embodiments. For example, when the application client and the target SIP application server reside in different domains, the target SIP application server communicates with the client (or all clients in that other domain) via an application proxy. In this case the target SIP application server uses the application proxy certificate for DPK exchange. The application proxy in turn can also aid the target SIP application server with DPK distribution to all clients in that domain. As another variation, although the exemplary embodiment of FIG. 3 shows the protection keys being sent together with the first protected SIP payload, according to another embodiment, the protection keys can instead be sent earlier, e.g., with the SIP OK messages 90, 92. Moreover, although the exemplary embodiment of FIG. 3 describes a per-watcher protection scheme, as yet another variant, for potentially better performance, the target SIP application server can apply a per-target key scheme so that the same DPK is used for a given target SIP application server, but measures may be needed to address the risk of recently de-authorized watchers as described above.

Figure 4:
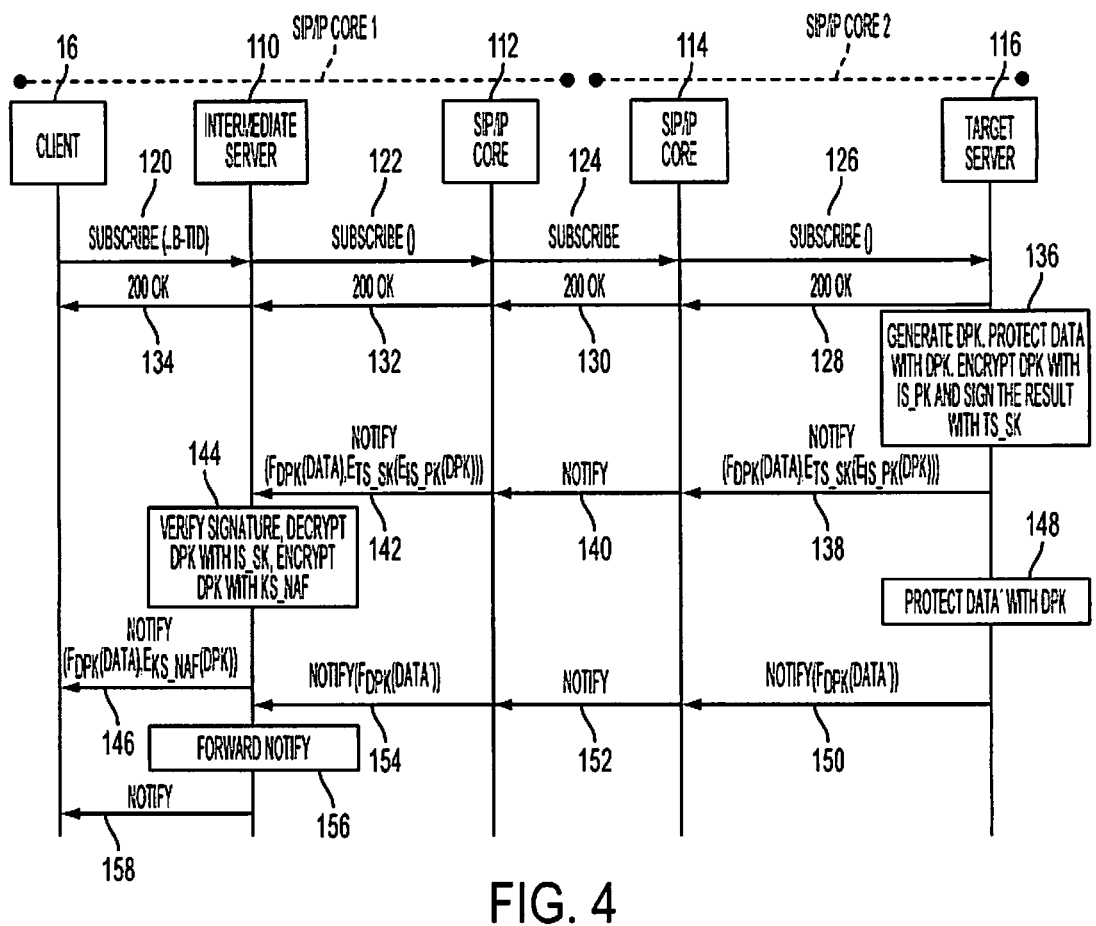
FIG. 4 is a signaling diagram which illustrates the protection of SIP payloads traveling between two different SIP/IP domains according to an exemplary embodiment.

According to another exemplary embodiment, when a SIP application client 16 (residing in a UE 14) communicates, via intermediate application server 110, with a target SIP application server 116 that is located in another domain, GBA and PKI key management can be used together, as shown in FIG. 4. In the context of FIG. 1, the intermediate server 110 could be, for example, application server 31 and the target SIP application server could be, for example, application server 33, albeit new reference numbers are used here for clarity. As distinguished from the exemplary embodiment of FIG. 2, the intermediate server 110 does not use KS_NAF key information to derive DPK(s) or generate DPK(s) by itself. Instead, the intermediate server 110 receives DPK from the target SIP application server 116 and then uses KS_NAF (or a key derived from KS_NAF) to protect DPK when transmitting SIP payload data to the application client 16. Initially, the application client 16 sends a SIP method, such as SIP SUBSCRIBE 120, to the intermediate server (IS) via the SIP/IP core 112. The SIP method message 120 contains the B-TID that was obtained previously during GBA bootstrapping.

The IS 110 retrieves KS_NAF from the BSF 44 (not shown in FIG. 4), removes the B-TID parameter from the SIP SUBSCRIBE message 120 and forwards it to the target SIP application server (TS) 116 as SIP SUBSCRIBE messages 122, 124 and 126 via intervening SIP/IP core nodes 112 and 114. The IS 110 can also add its public key or certificate denoted as IS_PK in this exemplary embodiment to the SIP SUBSCRIBE message 124. The TS 116 verifies IS_PK, e.g., using PKI function 50. The TS 116 replies with SIP 200 OK message 128, which can include the target SIP application server 116's public key or its certificate, denoted herein as TS_PK. This message is forwarded on via SIP/IP core elements 114, 112 using messages 130 and 132 to the IS 110.

The IS 110 verifies the received TS _PK, e.g., using PKI function 48. After verification, the IS 110 sends SIP 200 OK message 134 to the application client 16. Then, when the TS 116 has some sensitive data to send to the application client 116, it generates the DPK(s) and protects the data with DPK(s), and the TS 116 also encrypts the DPK with the intermediate server 110's public key IS_PK and signs the result with its private key TS_SK, i.e., using PKI protection techniques as shown in block 136. The TS 116 sends the encrypted data, together with the protected DPK, using an appropriate SIP method, for example SIP NOTIFY message 138, e.g., using integrity and/or confidentiality protection as described above with respect to other exemplary embodiments.

The SIP payload data, protected using PKI techniques according to this exemplary embodiment, are forwarded on to IS 110 via messages 140 and 142 as shown in FIG. 4. Upon receipt, the IS 110 verifies the target SIP application server's signature, and then decrypts the received DPK(s) with its private key IS_SK. The IS 110 re-encrypts the DPK(s) using KS_NAF key information and forwards the encrypted data, together with the re-encrypted DPK as shown in block 144, to the application client 16 via SIP NOTIFY message 146. When the TS 116 has new sensitive data (denoted data' in block 148) to send to the application client 16, it protects the new data with the same DPK and sends the result with another SIP method, e.g. SIP NOTIFY message 150, which is then forwarded on to the application client 16 via messages/processes 154, 156 and 158.

The DPK(s) generated by the target SIP application server 116 can be generated on either a per-watcher or a per-target basis as described above in the earlier described exemplary embodiments. In the latter case, if both types of application clients, i.e. UE and AS based, are subscribed in a same domain, the intermediate server 110 for that domain can distribute the same DPK in two different ways, e.g., after step 144 in FIG. 4. Specifically, for UE based client application 16, the intermediate server 110 can encrypt DPK with Ks NAF (or a key derived from Ks_NAF), while for AS based client applications 20, the intermediate server 110 can encrypt DPK with the public key of the AS, as described above.

As mentioned briefly above, since these exemplary embodiments provide various protection schemes for SIP payload involving different types of client applications and, potentially, different SIP/IP domains, there are certain aspects of key generation/derivation itself which may be impacted. For example, a new GBA Ua Security Protocol Identifier is needed. The Ua notation refers to the interface between a UE and the NAF. The security protocol used over Ua can be e.g., HTTPS and has an identifier which is used in calculation of Ks_NAF (more specifically, the Fully Qualified Domain Name of the NAF is concatenated with the Ua Security Protocol Identifier to form NAF_ID that is an input to the Ks NAF calculation). Additionally, the protection keys themselves which are used in the aforedescribed exemplary embodiments may be derived from Ks NAF using the GBA key derivation function (see e.g., Annex B of the 3GPP standards document TS 33.220 "Generic Authentication Architecture (GAA); Generic bootstrapping architecture). Consider the following example for key derivation for the case when two keys are needed, DEK and DIK, i.e., for both confidentiality (encryption) and integrity, respectively, as follows using the notational style in the above-identified standards document.

FC=0×01

P0="applic-dek" or "applic-dik" (where applic should be replaced with the application name), and L0=length of P0 is 10 octets (i.e. 0×00 0×A).

The key to be used in key derivation is Ks_NAF (i.e., a NAF specific key) as specified in the above-identified standards document. In summary, the keys DEK/DIK shall be derived from the Ks_NAF and a static string as follows:

DEK=KDF (Ks_NAF, "applic-dek")

DIK=KDF (Ks_NAF, "applic-dik")

Some other considerations to note. When the DPK is shared among clients-watchers (both terminal- or AS-based), the target SIP application server should check, e.g., upon each notification, whether any of the clients has become unauthorized to receive updates (e.g., has left the buddy list) and if so, the target SIP application server should then update and redistribute new DPKs. Generally speaking the afore-described techniques preserve the security of SIP payloads which are traversing nodes that would otherwise have access to such data. However in some cases access by such nodes may be warranted. Accordingly, when an intermediate application server needs access to the SIP payload, e.g., due to policies, the node can decrypt data, apply policy, and if the payload has been modified, re-encrypt the payload using the same DPK. Also, it will be appreciated that the protected SIP payload can be packaged using different technologies, e.g., XML Signature for integrity protection, XML encryption for confidentiality protection, S/MIME for integrity and/or confidentiality, and/or CMS (RFC 3852) for integrity and/or confidentiality.

Figure 5:
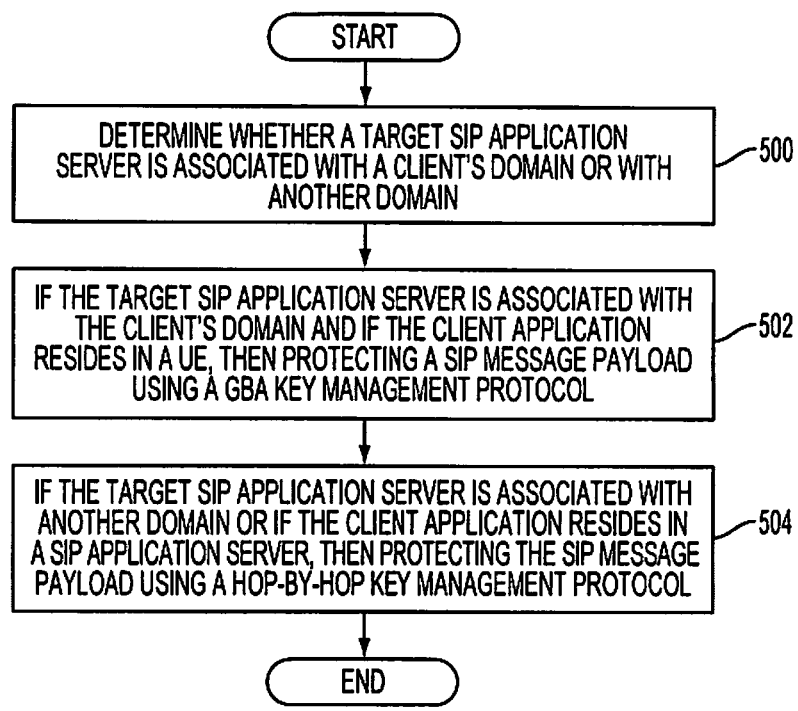
FIG. 5 is a flowchart illustrating a method for protecting SIP message payloads according to an exemplary embodiment.

From reviewing the foregoing exemplary embodiments, it will be appreciated by those skilled in the art that such exemplary embodiments provide for, among other things, a composite key management for e2e protection of SIP payloads in client-server and server-server communications and use of GBA in various SIP-based applications such as location, presence, messaging, address book. An exemplary method for protecting a Session Initiation Protocol (SIP) message payload transmitted between a target SIP application server toward a client application residing in one of a user equipment (UE) or in another SIP application server is illustrated in the flowchart of FIG. 5. Therein, at step 500, it is determined whether the target SIP application server is associated with the client application's domain or with another domain which is different than the client application's domain. If the target SIP application server is associated with the client application's domain and if the client application resides in the UE, then the SIP message payload is protected using a Generic Bootstrapping Architecture (GBA) key management protocol (step 502). If, on the other hand, the target SIP application server is associated with another domain or if the client application resides in another SIP application server, then the SIP message payload is protected using a hop-by-hop key management protocol (step 504) with no exposure to non-authorized parties.

Figure 6:
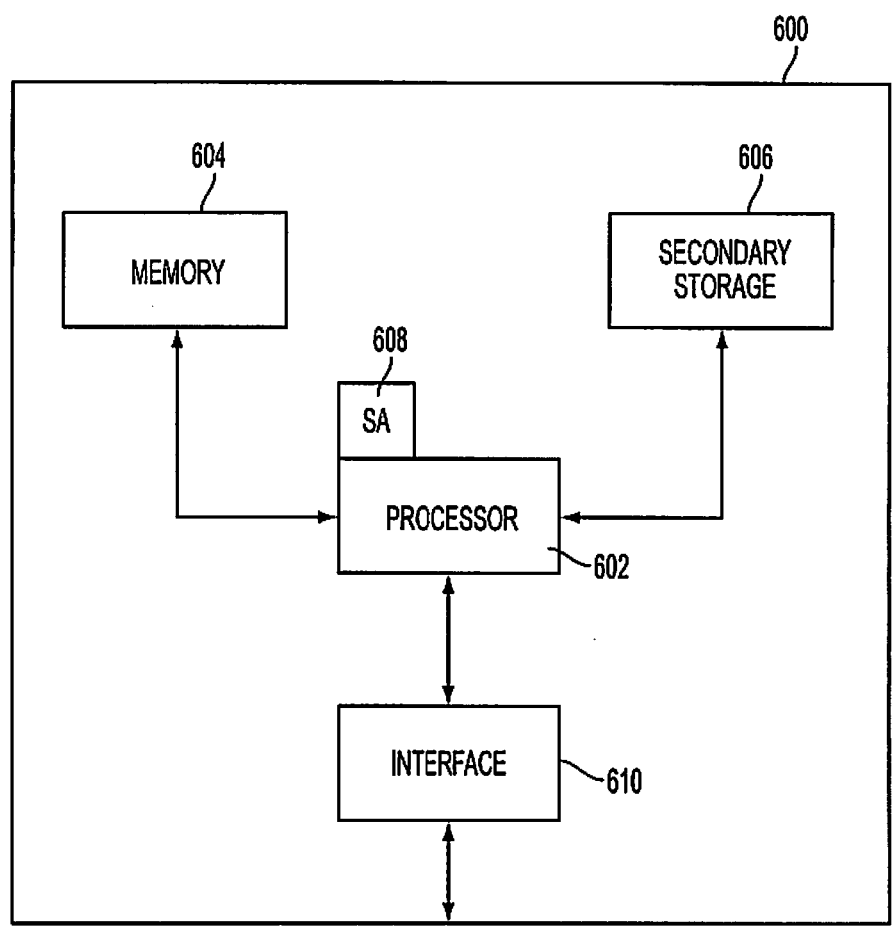
FIG. 6 is a server which can operate to protect SIP payloads according to exemplary embodiments.

The exemplary embodiments described above provide for, among other things, implementing a target SIP application server and/or an intermediate SIP application server which selectively applies various protection schemes based upon, for example, the type of network entity in which the client application receiving a particular SIP payload resides and the domain in which the client application resides relative to the domain in which the target SIP application server resides. An exemplary target SIP application server and/or intermediate SIP application server 600 can have, for example, the components shown in FIG. 6. Therein, server 600 can contain a processor 602 (or multiple processor cores), memory 604, one or more secondary storage devices 606, one or more software applications (SA) 608 running on the processor(s) 602 and an interface unit 610 to facilitate communications between node 600 and the rest of the network. In some cases, interface 610 may include a wireless transceiver for communicating with other nodes via an air interface, which will enable the node 600 to exchange the signals described above with respect to, for example, FIGS. 2-4.

As will be appreciated by those skilled in the art, methods such as those described herein can be implemented completely or partially in software. Thus, systems and methods for processing data according to exemplary embodiments of the present invention can be performed by one or more processors executing sequences of instructions contained in a memory device. Such instructions may be read into the memory device 604 from other computer-readable mediums such as secondary data storage device(s) 606, which may be fixed, removable or remote (network storage) media. Execution of the sequences of instructions contained in the memory device causes the processor to operate, for example, as described above. In alternative embodiments, hard-wire circuitry may be used in place of or in combination with software instructions to implement exemplary embodiments.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for protecting a Session Initiation Protocol (SIP) message payload transmitted between a target SIP application server toward a client application residing in one of a user equipment (UE) or in another SIP application server comprising:
    determining an appropriate protection scheme for protecting said SIP message payload based on whether said target SIP application server is associated with said client application's domain or with another domain which is different than said client application's domain;
    if said target SIP application server is associated with said client application's domain and if said client application resides in said UE, then protecting said SIP message payload using a Generic Bootstrapping Architecture (GBA) key management protocol between said client application residing in said UE and said target SIP application server; and
    if said target SIP application server is associated with said another domain or if said client application resides in said another SIP application server, then protecting said SIP message payload using a hop-by-hop key management protocol between said client application and said target SIP application server.

2. The method of claim 1, wherein if said target SIP application server is associated with said another domain, then protecting said SIP message payload using a hop-by-hop key management protocol by:
    applying said GBA key management protocol for protection of the SIP message payload between the user equipment and an intermediate SIP application server which is operating as a SIP router and which is located in said user equipment's domain; or
    applying public key infrastructure (PKI) key protection of the SIP message payload between the application client in a separate SIP application server and the target SIP application server; and
    applying public key infrastructure (PKI) key protection for protection of the SIP message payload between the intermediate SIP application server and the target SIP application server.

3. The method of claim 2, further comprising:
    receiving, at said intermediate SIP application server, a payload protection key from said target SIP application server;
    encrypting and forwarding said payload protection key using PKI or GBA to said client application; and
    using said payload protection key, by said client application, to decrypt subsequently received protected SIP message payloads from said target SIP application server.

4. The method of claim 1, wherein said step of applying said GBA key management protocol further comprises:
    deriving protection keys on a per-subscribed-client basis, wherein a plurality of client applications subscribed to the target SIP application server will receive additional protected SIP message payloads for said target SIP application server, wherein each protection key is different from one another.

5. The method of claim 4, further comprising the step of:
    generating said protection key at said user equipment by said client application; and
    using said generated protection key to decrypt subsequently received protected SIP message payloads from said target SIP server.

6. The method of claim 1, wherein said step of applying said GBA key management protocol further comprises:
    deriving protection keys on a per-target basis, wherein a plurality of subscribed clients subscribed to the target SIP application will receive additional protected SIP message payloads for said target SIP application, wherein each protection key is the same.

7. The method of claim 6, further comprising the step of:
    generating said protection key at said target SIP application server;
    sending said protection key to said client application using GBA or PKI; and
    using said generated payload protection key to decrypt subsequently received protected SIP message payloads from said target SIP server.

8. An intermediate SIP server for routing SIP messages from a target SIP application server located in a first SIP/IP domain to a client application located in a second SIP/IP domain comprising:
    an interface for receiving a first SIP message directed to said client application, said message including an encrypted SIP payload protection key from said target SIP application server; and
    processing circuitry for:
        determining an appropriate protection scheme for protecting said SIP message payload based on whether said client application resides in an application server or in a user equipment;

decrypting said encrypted SIP payload protection key with a secret key associated with said intermediate SIP server, re-encrypting said decrypted SIP payload protection key using a public key infrastructure (PKI) technique if said client application resides in an application server;

re-encrypting said encrypted SIP payload protection key using a Generic Bootstrapping Architecture (GBA) technique if said client application resides in a user equipment, and transmitting said re-encrypted SIP payload protection key toward said application client.

9. The intermediate SIP server of claim 8, wherein said processing circuitry is further configured to verify a signature associated with said encrypted SIP payload protection key.

10. A target SIP application server which transmits SIP payloads toward application clients comprising:

an interface for receiving SIP messages requesting additional protected SIP message payloads from said target SIP application server; and processing circuitry for generating and transmitting protected SIP payloads for transmission to client applications in response to said SIP messages, wherein said processing circuitry determines an appropriate protection scheme for protecting said SIP payload based on whether said client application resides in an application server or in a user equipment;

wherein said processing circuitry protects said SIP payloads using:

a public key infrastructure (PKI) technique for SIP payloads to be transmitted toward client applications which reside in an application server; and a Generic Bootstrapping Architecture (GBA) technique for SIP payloads to be transmitted toward client applications which reside in a user equipment.

11. The target SIP server of claim 10, wherein said processing circuitry protects SIP payloads to be transmitted toward said client applications which reside in user equipment using said GBA technique only if said user equipment is disposed in a same SIP/IP domain as said target SIP application server.

12. The target SIP server of claim 10, wherein said processing circuitry uses said GBA technique to protect said SIP payloads by deriving protection keys on a per-subscribed-client basis, wherein a plurality of client applications subscribed to the target SIP application server will receive protected SIP message payloads for said target SIP application server, wherein each protection key is different from one another.

13. The target SIP server of claim 10, wherein said processor processing circuitry uses said GBA technique to protect said SIP payloads by deriving protection keys on a per-target basis, wherein a plurality of subscribed clients subscribed to the target SIP application will receive additional protected SIP message payloads for said target SIP application, wherein each protection key is the same.

* * * * *

UNITED STATES PATENT AND TRADEMARK OFFICE
CERTIFICATE OF CORRECTION

PATENT NO. : 8,935,529 B2  
APPLICATION NO. : 12/627984  
DATED : January 13, 2015  
INVENTOR(S) : Cheng et al.

Page 1 of 1

It is certified that error appears in the above-identified patent and that said Letters Patent is hereby corrected as shown below:

In the specification,

In Column 9, Line 47, delete "Ks NAF" and insert -- Ks_NAF --, therefor.

In Column 9, Line 63, delete "Ks NAF" and insert -- Ks_NAF --, therefor.

In Column 9, Line 65, delete "Ks NAF" and insert -- Ks_NAF --, therefor.

Signed and Sealed this  
Twenty-third Day of February, 2016

Michelle K. Lee  
*Director of the United States Patent and Trademark Office*